United States Patent
Huo et al.

(10) Patent No.: US 11,284,244 B1
(45) Date of Patent: Mar. 22, 2022

(54) DATA WHITE BOX DEVICE UTILIZED IN CONJUNCTION WITH INTELLIGENT TERMINAL

(71) Applicant: Unigroup Guoxin Microelectronics Co., Ltd., Beijing (CN)

(72) Inventors: Hangyu Huo, Beijing (CN); Daojie Ma, Beijing (CN); Linlin Su, Beijing (CN); Jiawei Liu, Beijing (CN)

(73) Assignee: Unigroup Guoxin Microelectronics Co., Ltd., Beijing (CN)

( * ) Notice: Subject to any disclaimer, the term of this patent is extended or adjusted under 35 U.S.C. 154(b) by 0 days.

(21) Appl. No.: 17/135,677

(22) Filed: Dec. 28, 2020

(30) Foreign Application Priority Data

Oct. 16, 2020 (CN) .......................... 202011111114.5

(51) Int. Cl.
*H04W 12/40* (2021.01)
*H04W 8/18* (2009.01)
*H04W 12/03* (2021.01)

(52) U.S. Cl.
CPC ............. *H04W 8/18* (2013.01); *H04W 12/03* (2021.01); *H04W 12/40* (2021.01)

(58) Field of Classification Search
CPC .................................. H04W 8/18; H04W 12/04
See application file for complete search history.

(56) References Cited

U.S. PATENT DOCUMENTS

2009/0031145 A1* 1/2009 Nishiyama ......... H04N 1/32432
713/193
2019/0268169 A1* 8/2019 Castillo ................... B60R 25/24

FOREIGN PATENT DOCUMENTS

| CN | 210627203 U | 5/2020 |
| WO | WO-2015067056 A1 | 5/2015 |
| WO | WO-2018219490 A1 | 12/2018 |

OTHER PUBLICATIONS

Extended European Search Report regarding Application No. 20215739.2 dated Apr. 23, 2021.

* cited by examiner

*Primary Examiner* — Michael T Vu
(74) *Attorney, Agent, or Firm* — Harness, Dickey & Pierce, P.L.C.

(57) ABSTRACT

A data white box device utilized in conjunction with an intelligent terminal is provided. The data white box device includes a controller, a memory, and an SIM unit. The controller provides support for management of the memory and call of the SIM unit. The memory provides a physical medium for storing data of the intelligent terminal. The SIM unit provides support for encryption and security authentication of the data of the intelligent terminal.

10 Claims, 5 Drawing Sheets

DATA WHITE BOX DEVICE UTILIZED IN CONJUNCTION WITH INTELLIGENT TERMINAL

CROSS REFERENCE TO RELATED APPLICATION

The present application claims priority to Chinese Patent Application No. 202011111114.5, titled "DATA WHITE BOX DEVICE UTILIZED IN CONJUNCTION WITH INTELLIGENT TERMINAL", filed on Oct. 16, 2020 with the Chinese Patent Office, which is incorporated herein by reference in its entirety.

FIELD

The present disclosure relates to the technical field of communications, and in particular to a data white box device utilized in conjunction with an intelligent terminal.

BACKGROUND

With continuous development of Internet information technology, intelligent terminals are widely used in daily production and life. For example, general-purpose Internet of Things terminals are used in the technical field of Internet of Things. With the development of the Internet of Things technology, general-purpose Internet of Things terminals cannot meet specific use requirements. Therefore, an Internet of Things terminal is to be customized and developed for specific use requirements. Practically, a scale of customizing and developing one Internet of Things terminal, for example, customized and developed for specific use requirements of only one user or a few users, is relatively small, resulting in a high cost of customizing and developing the Internet of Things terminal, and thus restricting promotion and popularization of the Internet of Things technology.

In addition, a user may have different security requirements for the intelligent terminal in different application scenarios. Therefore, if one intelligent terminal cannot meet security requirements of the user in different application scenarios, the user may require different intelligent terminals. For example, in one scenario, security authentication is unnecessary and thus an intelligent terminal A is used. In another scenario, security authentication is required and the intelligent terminal A is not provided with hardware related to security authentication. Therefore, only an intelligent terminal B provided with hardware related to security authentication can be selected. It can be seen that accessing security of the intelligent terminal is important.

SUMMARY

In view of the above problems, a data white box device utilized in conjunction with an intelligent terminal is provided according to the present disclosure, so as to reduce the cost of the intelligent terminal and improve security of accessing the intelligent terminal.

The following technical solutions are provided according to embodiments of the present disclosure disclose.

A data white box device utilized in conjunction with an intelligent terminal is provided according to a first aspect of the present disclosure. The data white box device includes a controller, a memory, and a subscriber identity module (SIM) unit. Both the memory and the SIM unit are connected to the controller. The controller is connected to the intelligent terminal in a case that the data white box device is utilized in conjunction with the intelligent terminal. The data white box device is configured to implement at least one of a data storage function, a data transmission function and a data access function.

In an embodiment, the data storage function includes at least one of a data direct storage function and a data encryption storage function.

In an embodiment, in a case that the data white box device is configured to implement the data direct storage function, the controller is configured to receive data sent by the intelligent terminal and send the data to the memory.

In an embodiment, in a case that the data white box device is configured to implement the data encryption storage function, the controller is configured to receive data sent by the intelligent terminal and send the data to the SIM unit; the SIM unit is configured to encrypt the data and send the encrypted data to the controller; and the controller is configured to send the encrypted data to the memory.

In an embodiment, in a case that the data white box device is configured to implement the data transmission function, the controller is configured to receive data sent by the intelligent terminal and send the data to the SIM unit; the SIM unit is configured to encrypt the data and send the encrypted data to the controller; and the controller is configured to send the encrypted data to the intelligent terminal, so that the intelligent terminal sends the encrypted data to a target terminal.

In an embodiment, in a case that the data white box device is configured to implement the data access function, the controller is configured to receive an access instruction sent by the intelligent terminal and send the access instruction to the SIM unit; the access instruction is sent from a visiting terminal to the intelligent terminal; the SIM unit is configured to authenticate the access instruction and send a first authentication result to the controller; and the controller is further configured to send the first authentication result to the intelligent terminal. In a case that the first authentication result indicates unsuccessful authentication, the intelligent terminal is configured to feed back the first authentication result to the visiting terminal. In a case that the first authentication result indicates successful authentication, the intelligent terminal is configured to send an access permission instruction to the controller, and the controller is further configured to perform an access operation in response to the access permission instruction.

In an embodiment, in a case that the data white box device is utilized in conjunction with the intelligent terminal, the SIM unit is connected to the intelligent terminal.

In an embodiment, the data white box device is connected to the intelligent terminal in a pluggable manner.

In an embodiment, in a case that the data white box device is utilized in conjunction with the intelligent terminal, the data white box device is arranged inside or outside a housing of the intelligent terminal.

In an embodiment, the intelligent terminal is any one of a mobile phone, a tablet computer, a headset and an Internet of Things terminal. The Internet of Things terminal is any one of a camera, a vehicle-mounted intelligent terminal, an intelligent three-meter and an industrial control terminal.

In an embodiment, the intelligent terminal includes a control module. The controller is connected to the control module.

Compared with the conventional technology, the present disclosure has the following beneficial effects.

A data white box device is provided according to the technical solutions of the present disclosure. The data white box device may be utilized in conjunction with a general-purpose intelligent terminal. The data white box device includes a controller, a memory, and a SIM unit. Both the memory and the SIM unit are connected to the controller. The controller is connected to the intelligent terminal in a case that the data white box device is utilized in conjunction with the intelligent terminal. The data white box device is configured to implement at least one of a data storage function, a data transmission function and a data access function. In the present disclosure, the controller is configured to provide support for management of the memory and call of the SIM unit. The memory is configured to provide a physical medium for storing data of the intelligent terminal. The SIM unit is configured to provide support for encryption and security authentication of the data of the intelligent terminal. Programs may be configured in the memory based on various requirements. Therefore, the data white box device is utilized in conjunction with the intelligent terminal, so that configuration requirements for hardware and software of the intelligent terminal itself can be greatly reduced, and functions can be implemented by a general-purpose intelligent terminal. Therefore, it is unnecessary to customize and develop an intelligent terminal for specific use requirements, thereby reducing the cost of the intelligent terminal. In addition, the data access function is ensured by the SIM unit of the data white box device. Therefore, compared with the conventional technology, the security of accessing the intelligent terminal can be improved by utilizing the data white box device in conjunction with the intelligent terminal.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from the drawings without any creative work.

DETAILED DESCRIPTION OF EMBODIMENTS

As described above, currently, the cost of customizing and developing an intelligent terminal is high, and the security of accessing the intelligent terminals is poor.

It is found by the inventor from research that, production efficiency of the intelligent terminal can be improved and a cost of the intelligent terminal can be reduced by promoting generalization and standardization of hardware, and decoupling standardization and customization. In view of this, a data white box device utilized in conjunction with an intelligent terminal is proposed. The data white box device includes a controller, a memory and a subscriber identity module (SIM) unit. Both the memory and the SIM unit are connected to the controller. The controller is connected to the intelligent terminal in a case that the data white box device is utilized in conjunction with the intelligent terminal. The data white box device, when being connected to a data terminal, can implement at least one of a data storage function, a data transmission function and a data access function. Therefore, it is unnecessary to customize and develop an intelligent terminal for specific use requirements, thereby reducing the cost of the intelligent terminal. In addition, the data access function is ensured by the SIM unit of the data white box device. Therefore, compared with the conventional technology, the security of accessing the intelligent terminal can be improved with the technical solutions in embodiments of the present disclosure.

The technical solutions in the embodiments of the present disclosure are described clearly and completely in conjunction with the drawings in the embodiments of the present disclosure hereinafter, so that those skilled in the art can better understand the technical solutions of the present disclosure. It is apparent that the described embodiments are only some rather than all embodiments of the present disclosure. All other embodiments obtained by those skilled in the art based on the embodiments of the present disclosure without any creative work fall within the protection scope of the present disclosure.

White box refers to decoupling between software (for example, data, application and system) and hardware (intelligent terminal). Particularly, a data white box refers to decoupling between data and an intelligent terminal. That is, all the data is installed in a white box device rather than the intelligent terminal.

First Embodiment

Figure 1:
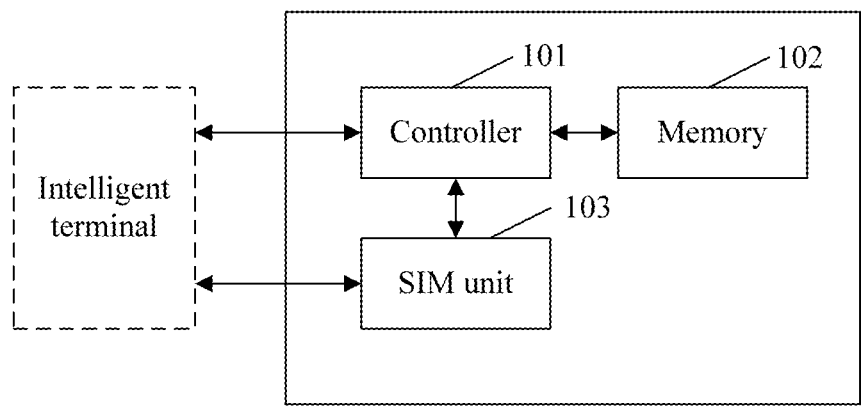
FIG. 1 is a schematic structural diagram of a data white box device utilized in conjunction with an intelligent terminal according to an embodiment of the present disclosure.

Reference is made to FIG. 1, which is a schematic structural diagram of a data white box device utilized in conjunction with an intelligent terminal according to an embodiment of the present disclosure.

As shown in FIG. 1, the data white box device utilized in conjunction with an intelligent terminal according to the embodiment of the present disclosure includes a controller 101, a memory 102, and a subscriber identity module (SIM) unit 103. Both the memory 102 and the SIM unit 103 are connected to the controller 101. The controller 101 is connected to the intelligent terminal in a case that the data white box device is utilized in conjunction with the intelligent terminal. In an example, the controller 101 may communicate with the intelligent terminal by utilizing a data protocol of SD3.0.

It should be noted that the controller 101 is configured to provide support for management of the memory 102 and call of the SIM unit 103. The memory 102 is configured to provide a physical medium for storing data of the intelligent terminal. The SIM unit 103 is configured to provide support for encryption and security authentication of the data of the intelligent terminal.

In the technical solutions of the present disclosure, the intelligent terminal refers to a terminal device which is capable of computing, storing and communicating, and is provided with a sensor and an input and output interface. In an example, the intelligent terminal may be a portable intelligent terminal such as a mobile phone, a tablet computer, or a headset. Alternatively, the intelligent terminal may be an Internet of Things terminal. A type of the intelligent terminal is not limited herein.

In an example, the Internet of Things terminal may be any one of a camera, a vehicle-mounted intelligent terminal, an intelligent three-meter (including an intelligent water meter, an intelligent electric meter, and an intelligent gas meter), and an industrial control terminal.

For the data white box device according to the embodiment of the present disclosure, white box indicates that the intelligent terminal is utilized in conjunction with the data white box device and thus data originally required to be stored in the intelligent terminal can be stored in the data white box device. That is, the data white box device causes the intelligent terminal connected to the data white box device to be white-boxed.

For example, in a case that the intelligent terminal is a mobile phone, data in the mobile phone is stored in the memory of the data white box device. A hardware unit (SIM unit) with security authentication in the data white box device can protect the data in the mobile phone. In a case that the mobile phone is lost, nobody except the user can crack the security authentication, thereby protecting the security of the data in the mobile phone.

The data white box device is configured to implement at least one of a data storage function, a data transmission function and a data access function.

Next, the data storage function, the data transmission function and the data access function implemented by the data white box device are respectively described. In the following description, the Internet of Things terminal is taken as an example of the intelligent terminal for illustration. It should be understood that the intelligent terminal that can be utilized in conjunction with the data white box device is not limited to the Internet of Things terminal.

(1) Data Storage Function

In the embodiment of the present disclosure, in consideration of high security requirements for data of some Internet of Things terminals currently, the data storage function implemented by the data white box device may include at least one of a data direct storage function and a data encryption storage function.

The data direct storage function and the data encryption storage function are described below with reference to FIGS. 2 and 3 respectively.

In a case that the data white box device is configured to implement the data direct storage function, the controller is configured to receive data sent by the Internet of Things terminal and send the data to the memory.

Figure 2:
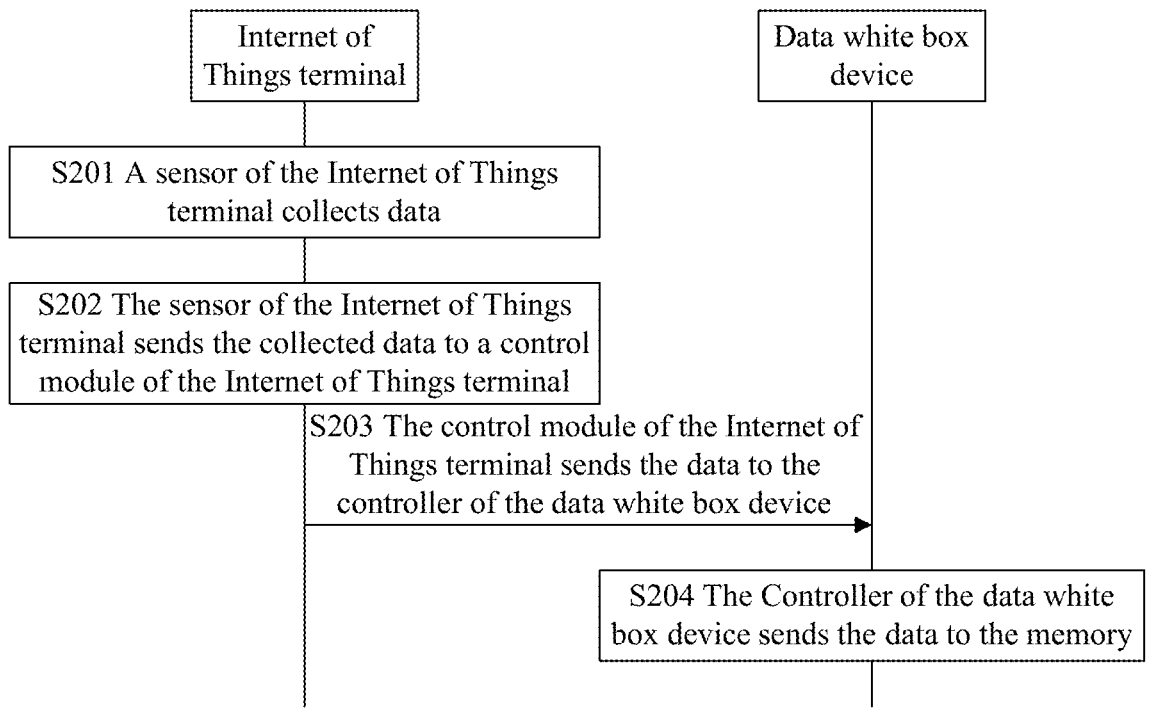
FIG. 2 is a schematic diagram showing signaling of a method for implementing a data direct storage function by the data white box device according to an embodiment of the present disclosure.

Reference is made to FIG. 2, which is a schematic diagram showing signaling of a method for implementing a data direct storage function by the data white box device according to an embodiment of the present disclosure.

As shown in FIG. 2, the method for implementing the data direct storage function by the data white box device according to the embodiment of the present disclosure may include the following steps S201 to S204.

In S201, a sensor of the Internet of Things terminal collects data.

In S202, the sensor of the Internet of Things terminal sends the collected data to a control module of the Internet of Things terminal.

In S203, the control module of the Internet of Things terminal sends the data to the controller of the data white box device.

In S204, the controller of the data white box device sends the data to the memory.

In a case that the data white box device is configured to implement the data encryption storage function, the controller is configured to receive data sent by the Internet of Things terminal and send the data to the SIM unit; the SIM unit is configured to encrypt the data and send the encrypted data to the controller; and the controller is configured to send the encrypted data to the memory.

Figure 3:
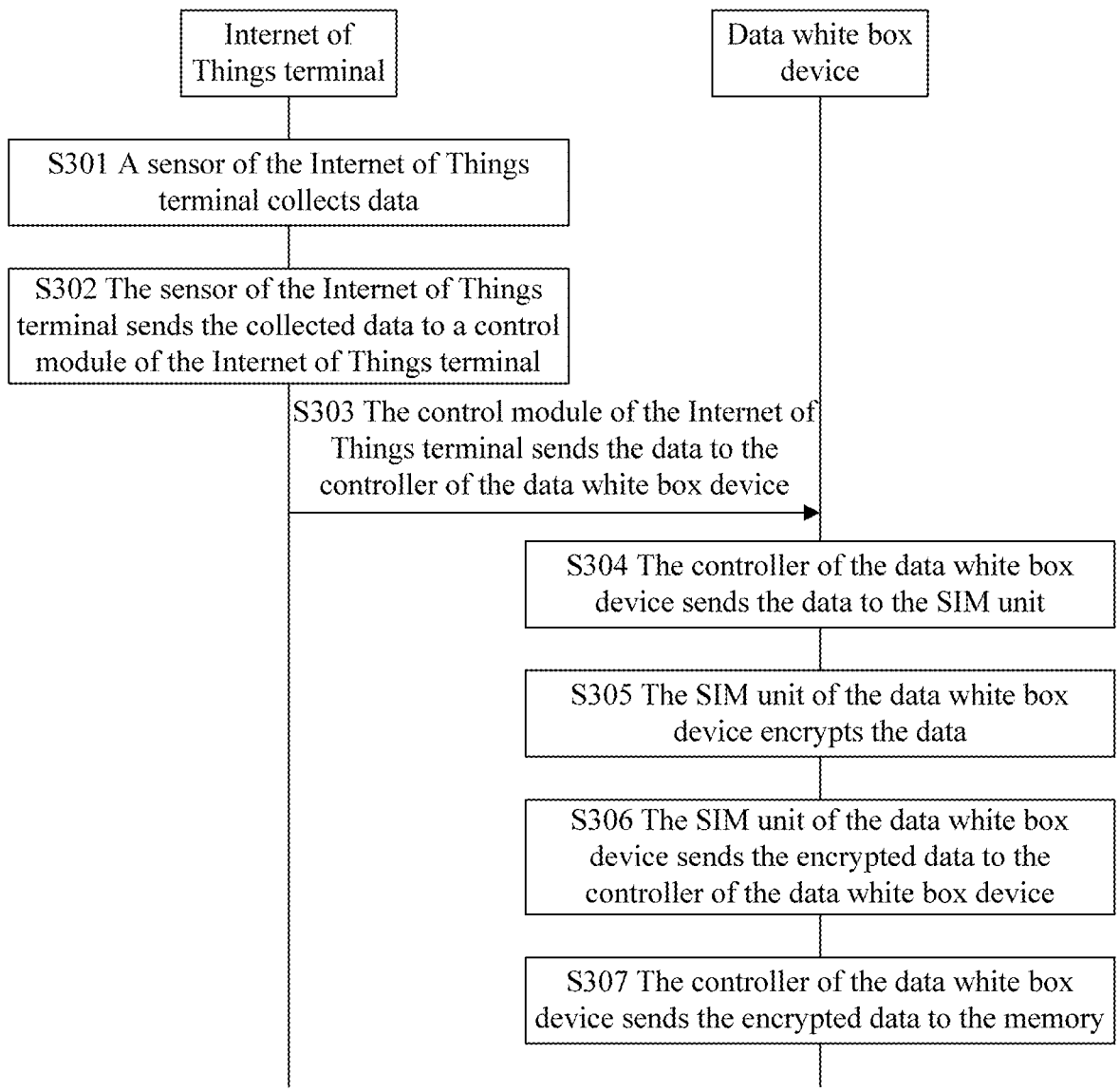
FIG. 3 is a schematic diagram showing signaling of a method for implementing a data encryption storage function by the data white box device according to an embodiment of the present disclosure.

Reference is made to FIG. 3, which is a schematic diagram showing signaling of a method for implementing a data encryption storage function by the data white box device according to an embodiment of the present disclosure.

As shown in FIG. 3, the method for implementing the data encryption storage function by the data white box device according to the embodiment of the present disclosure may include the following steps S301 to S307.

In S301, a sensor of the Internet of Things terminal collects data.

In S302, the sensor of the Internet of Things terminal sends the collected data to a control module of the Internet of Things terminal.

In S303, the control module of the Internet of Things terminal sends the data to the controller of the data white box device.

In S304, the controller of the data white box device sends the data to the SIM unit.

In S305, the SIM unit of the data white box device encrypts the data.

In S306, the SIM unit of the data white box device sends the encrypted data to the controller of the data white box device.

In S307, the controller of the data white box device sends the encrypted data to the memory.

It can be seen from the above two kinds of data storage functions that, the data white box device of the present disclosure can meet not only requirements of some Internet of Things terminals for direct storage of data, but also requirements of some Internet of Things terminals for encryption storage of data without changing hardware configuration of the data white box device. Therefore, it is unnecessary to customize and develop an Internet of Things terminal for specific use requirements, thereby reducing the cost of the Internet of Things terminal.

(2) Data Transmission Function

In the embodiment of the present disclosure, in a case that the data white box device is configured to implement the data transmission function, the controller is configured to receive data sent by the Internet of Things terminal and send the data to the SIM unit; the SIM unit is configured to encrypt the data and send the encrypted data to the controller; and the controller is configured to send the encrypted data to the Internet of Things terminal, so that the Internet of Things terminal sends the encrypted data to a target terminal.

Figure 4:
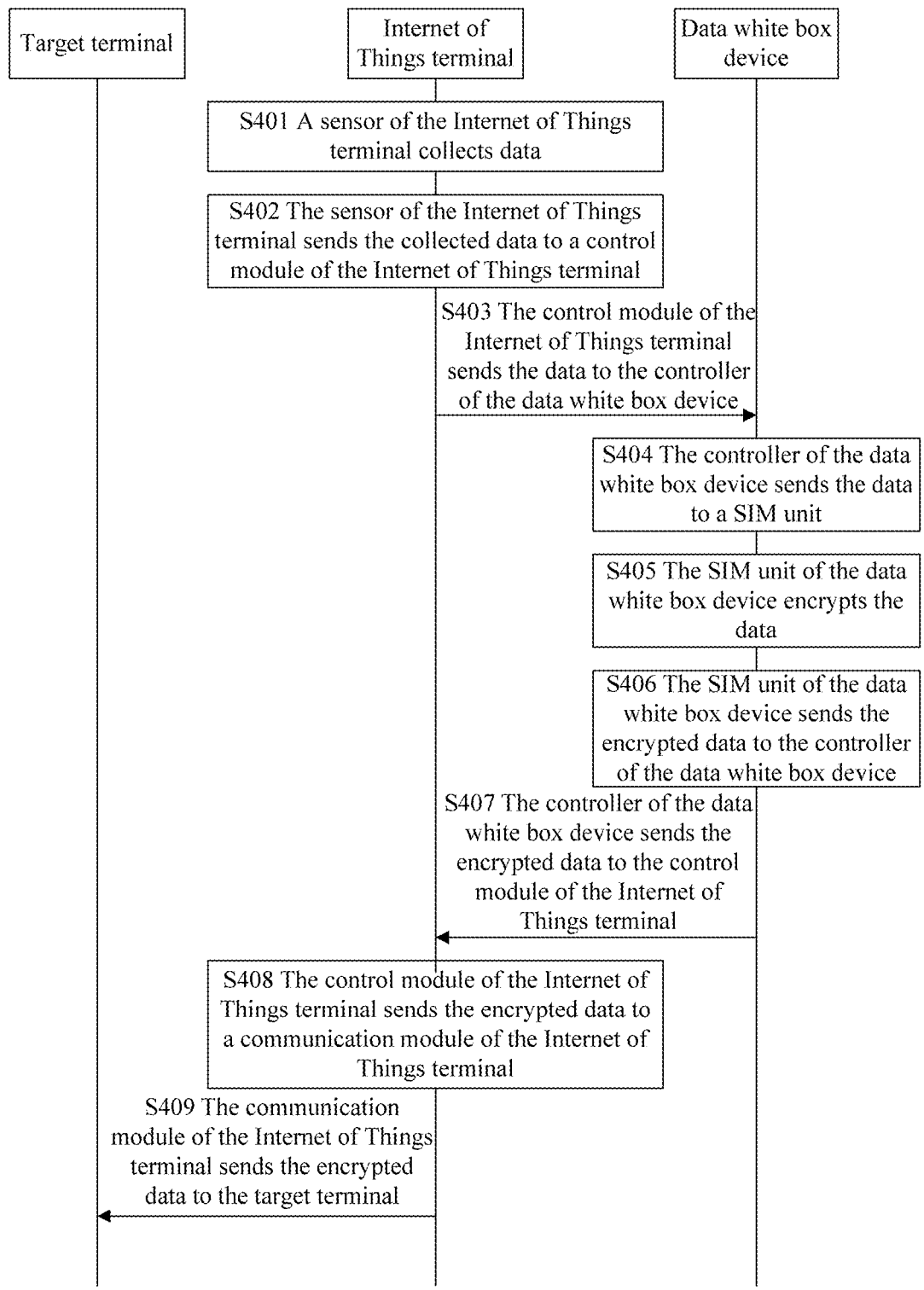
FIG. 4 is a schematic diagram showing signaling of a method for implementing a data transmission function by the data white box device according to an embodiment of the present disclosure.

Reference is made to FIG. 4, which is a schematic diagram showing signaling of a method for implementing a data transmission function by the data white box device according to an embodiment of the present disclosure.

As shown in FIG. 4, the method for implementing the data transmission function by the data white box device according to the embodiment of the present disclosure may include the following steps S401 to S409.

In S401, a sensor of the Internet of Things terminal collects data.

In S402, the sensor of the Internet of Things terminal sends the collected data to a control module of the Internet of Things terminal.

In S403, the control module of the Internet of Things terminal sends the data to the controller of the data white box device.

In S404, the controller of the data white box device sends the data to the SIM unit.

In S405, the SIM unit of the data white box device encrypts the data.

In S406, the SIM unit of the data white box device sends the encrypted data to the controller of the data white box device.

In S407, the controller of the data white box device sends the encrypted data to the control module of the Internet of Things terminal.

In S408, the control module of the Internet of Things terminal sends the encrypted data to a communication module of the Internet of Things terminal.

In S409, the communication module of the Internet of Things terminal sends the encrypted data to a target terminal.

(3) Data Access Function

In the embodiment of the present disclosure, in a case that the data white box device is configured to implement the data access function, the controller is configured to receive an access instruction sent by the Internet of Things terminal, and send the access instruction to the SIM unit, where the access instruction is sent from a visiting terminal to the Internet of Things terminal; the SIM unit is configured to authenticate the access instruction and send a first authentication result to the controller; and the controller is configured to send the first authentication result to the Internet of Things terminal. In a case that the first authentication result indicates unsuccessful authentication, the Internet of Things terminal is configured to feed back the first authentication result to the visiting terminal. In a case that the first authentication result indicates successful authentication, the Internet of Things terminal is configured to send an access permission instruction to the controller, and the controller is further configured to perform an access operation in response to the access permission instruction.

Figure 5:
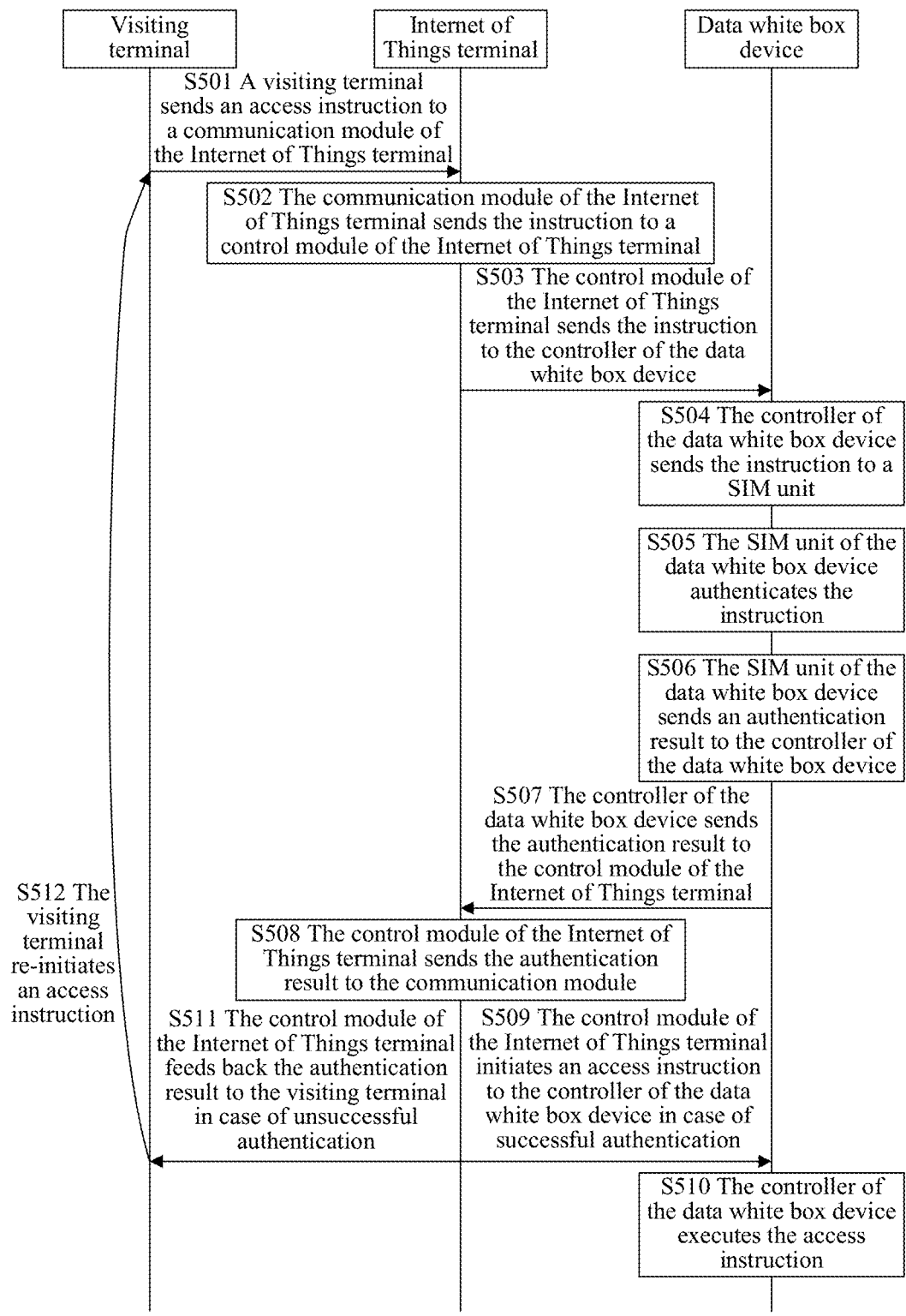
FIG. 5 is a schematic diagram showing signaling of a method for implementing a data access function by the data white box device according to an embodiment of the present disclosure.

Reference is made to FIG. 5, which is a schematic diagram showing signaling of a method for implementing a data access function by the data white box device according to an embodiment of the present disclosure.

As shown in FIG. 5, the method for implementing the data access function by the data white box device according to the embodiment of the present disclosure may include the following steps S501 to S512.

In S501, a visiting terminal sends an access instruction to a communication module of the Internet of Things terminal.

In S502, the communication module of the Internet of Things terminal sends the instruction to a control module of the Internet of Things terminal.

In S503, the control module of the Internet of Things terminal sends the instruction to the controller of the data white box device.

In S504, the controller of the data white box device sends the instruction to the SIM unit of the data white box device.

In S505, the SIM unit of the data white box device authenticates the instruction.

In S506, the SIM unit of the data white box device sends an authentication result to the controller of the data white box device.

In S507, the controller of the data white box device sends the authentication result to the control module of the Internet of Things terminal.

In S508, the control module of the Internet of Things terminal sends the authentication result to the communication module.

In S509, the control module of the Internet of Things terminal initiates an access instruction to the controller of the data white box device in case of successful authentication.

In S510, the controller of the data white box device executes the access instruction.

In S511, the control module of the Internet of Things terminal feeds back the authentication result to the visiting terminal in case of unsuccessful authentication.

In S512, the visiting terminal re-initiates an access instruction.

It can be seen from the detailed description of the data storage function, the data transmission function and the data access function implemented by the data white box device that, the SIM unit may be connected to the Internet of Things terminal in a case that the data white box device is utilized in conjunction with the Internet of Things terminal. It should be noted that the SIM unit is connected to the Internet of Things terminal, thereby sending the encrypted data or the encrypted authentication result to the Internet of Things terminal. In an example, the SIM unit may communicate with the Internet of Things terminal by utilizing 7816 communication protocol.

In the embodiments of the present disclosure, the data white box device may be connected to the Internet of Things terminal in a pluggable manner in order to further expand a range of application of the data white box device and improve flexibility of utilization of the data white box device. In this way, the Internet of Things terminal can be flexibly connected to the data white box device. For example, one data white box device may be connected to multiple Internet of Things terminals so as to implement multiple functions. Alternatively, one Internet of Things terminal may be connected to multiple data white box devices, thereby realizing data sharing among different Internet of Things terminals.

In the embodiments of the present disclosure, in a case that the data white box device is utilized in conjunction with the Internet of Things terminal, the data white box device may be arranged inside or outside a housing of the Internet of Things terminal, which is not limited herein.

Figure 6:
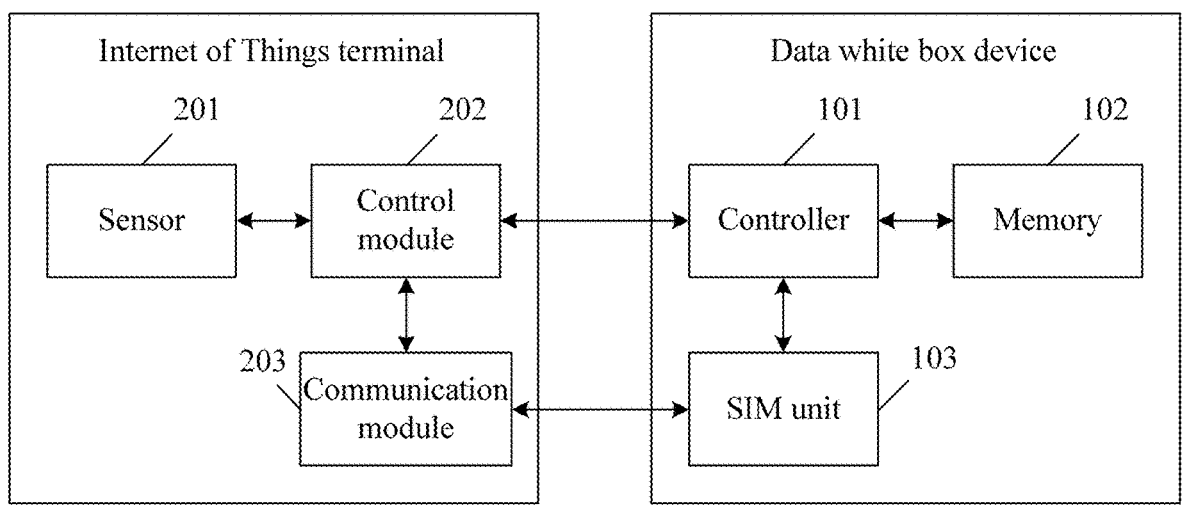
FIG. 6 is a schematic diagram showing connection between the data white box device and an Internet of Things terminal according to an embodiment of the present disclosure.

It can be seen from the detailed description of the data storage function, the data transmission function and the data access function implemented by the data white box device that, the Internet of Things terminal may include a control module. The controller of the data white box device may be connected to the control module so as to receive data or an instruction sent by the control module or send data or an instruction to the control module. In addition, the Internet of Things terminal may further include a sensor for collecting data. The Internet of Things terminal may further include a communication module for communicating with other device and the data white box device. FIG. 6 is a schematic diagram showing connection between the data white box device and an Internet of Things terminal. As shown in FIG. 6, both a sensor 201 and a communication module 203 of the Internet of Things terminal are connected to a control module 202. The control module 202 is connected to the controller 101 of the data white box device. The communication module 203 is further connected to the SIM unit 103 of the data white box device.

It can be seen from the above that, with the technical solutions of the present disclosure, a data white box device including a controller, a memory and an SIM unit is connected to an Internet of Things terminal, such that a part of functions of the Internet of Things terminal can be implemented by a universal data white box device. Therefore, it is unnecessary to customize and develop an Internet of Things terminal for specific use requirements, thereby reducing the cost of the Internet of Things terminal. In addition, the data access function is ensured by the SIM unit of the data white box device, such that the security of accessing the Internet of Things terminal can be improved.

It should be noted that the embodiments in this specification are described in a progressive way, each of which emphasizes the differences from others, and the same or similar parts among the embodiments can be referred to each other. Since the device and system disclosed in the embodiments are substantially similar to the method therein, the description thereof is relatively simple, and for relevant matters, references may be made to the description of the method. The above device and system embodiments are merely illustrative. The units described as separate components may or may not be physically separated, and the component displayed as a unit may or may not be a physical unit, that is, may be located in one place, or may be distributed on multiple network units. Some or all of the modules may be selected based on actual requirements to achieve the object of the technical solutions in the embodiments. Those skilled in the art can understand and implement the technical solutions without any creative work.

Only an implementation of the present disclosure is described above. However, the protection scope of the present disclosure is not limited thereto. Any changes or replacements that may be easily conceived by those skilled in the art within the technical scope disclosed in the present disclosure should fall within the protection scope of the present disclosure. Therefore, the protection scope of the present disclosure should be defined by the claims.

The invention claimed is:

1. A data white box device utilized in conjunction with an intelligent terminal, comprising:
   a controller;
   a memory; and
   a subscriber identity module (SIM) unit, wherein
   both the memory and the SIM unit are connected to the controller;
   the controller is connected to the intelligent terminal in a case that the data white box device is utilized in conjunction with the intelligent terminal; and
   the data white box device is configured to implement at least one of a data storage function, a data transmission function and a data access function,
   wherein in a case that the data white box device is configured to implement the data access function,
   the controller is configured to receive an access instruction sent by the intelligent terminal, and send the access instruction to the SIM unit, wherein the access instruction is sent from a visiting terminal to the intelligent terminal;
   the SIM unit is configured to authenticate the access instruction and send a first authentication result to the controller;
   the controller is configured to send the first authentication result to the intelligent terminal;
   the intelligent terminal is configured to feed back the first authentication result to the visiting terminal in a case that the first authentication result indicates unsuccessful authentication; and
   the intelligent terminal is further configured to send an access permission instruction to the controller and the controller is further configured to perform an access operation in response to the access permission instruction, in a case that the first authentication result indicates successful authentication.

2. The data white box device according to claim 1, wherein the data storage function comprises at least one of a data direct storage function and a data encryption storage function.

3. The data white box device according to claim 2, wherein in a case that the data white box device is configured to implement the data direct storage function, the controller is configured to receive data sent by the intelligent terminal and send the data to the memory.

4. The data white box device according to claim 2, wherein in a case that the data white box device is configured to implement the data encryption storage function,
   the controller is configured to receive data sent by the intelligent terminal and send the data to the SIM unit;
   the SIM unit is configured to encrypt the data and send the encrypted data to the controller; and
   the controller is configured to send the encrypted data to the memory.

5. The data white box device according to claim 1, wherein in a case that the data white box device is configured to implement the data transmission function,
   the controller is configured to receive data sent by the intelligent terminal and send the data to the SIM unit;
   the SIM unit is configured to encrypt the data and send the encrypted data to the controller; and
   the controller is configured to send the encrypted data to the intelligent terminal, wherein the intelligent terminal sends the encrypted data to a target terminal.

6. The data white box device according to claim 1, wherein in a case that the data white box device is utilized in conjunction with the intelligent terminal, the SIM unit is connected to the intelligent terminal.

7. The data white box device according to claim 1, wherein the data white box device is connected to the intelligent terminal in a pluggable manner.

8. The data white box device according to claim 1, wherein in a case that the data white box device is utilized in conjunction with the intelligent terminal, the data white box device is arranged inside or outside a housing of the intelligent terminal.

9. The data white box device according to claim 1, wherein the intelligent terminal is any one of a mobile phone, a tablet computer, a headset and an Internet of Things terminal, wherein the Internet of Things terminal is any one of a camera, a vehicle-mounted intelligent terminal, an intelligent three-meter and an industrial control terminal.

10. The data white box device according to claim 1, wherein the intelligent terminal comprises a control module, wherein the controller is connected to the control module.

* * * * *